United States Patent
Newbury (10) Patent No.: US 7,839,504 B1
(45) Date of Patent: Nov. 23, 2010

(54) MULTIPLE ORDER COMMON PATH SPECTROMETER

(75) Inventor: Amy B. Newbury, Boulder, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 603 days.

(21) Appl. No.: 11/836,694

(22) Filed: Aug. 9, 2007

(51) Int. Cl.
   *G01J 3/28* (2006.01)
(52) U.S. Cl. ..................................... 356/328
(58) Field of Classification Search ................ 356/326
   See application file for complete search history.

(56) References Cited

U.S. PATENT DOCUMENTS

| | | |
|---|---|---|
| 6,687,007 B1 | 2/2004 | Meigs |
| 6,816,258 B2 | 11/2004 | Hutchin |
| 7,199,876 B2 | 4/2007 | Mitchell |
| 7,483,135 B2 * | 1/2009 | Deck .......................... 356/329 |
| 2005/0264808 A1 | 12/2005 | Wang |

OTHER PUBLICATIONS

Levan and Maestas Jepson, "3.5- to 12-um Dual-Band Spectrometer", Optical Engineering, vol. 43 No. 12, pp. 3045-3054, Society of Photo-Optical Instrumentation Engineers, 2004, USA.
Schwartz, Kocjan and Driscoll, "Mid-wave/Long-wave Infrared Dual-Octave Hyperspectral Imaging Spectrometer", Aerospace Conference 2003 Proceedings, vol. 4, pp. 4-1831 to 4-1841 (pp. 1-11), IEEE, 2003, USA.

* cited by examiner

*Primary Examiner*—Tarifur Chowdhury
*Assistant Examiner*—Abdullahi Nur
(74) *Attorney, Agent, or Firm*—Sheridan Ross P.C.

(57) ABSTRACT

The present invention relates to a dispersive spectrometer. The spectrometer allows detection of multiple orders of light on a single focal plane array by splitting the orders spatially using a dichroic assembly. A conventional dispersion mechanism such as a defraction grating disperses the light spectrally. As a result, multiple wavelength orders can be imaged on a single focal plane array of limited spectral extent, doubling (or more) the number of spectral channels as compared to a conventional spectrometer. In addition, this is achieved in a common path device.

20 Claims, 6 Drawing Sheets

MULTIPLE ORDER COMMON PATH SPECTROMETER

STATEMENT REGARDING FEDERALLY SPONSORED RESEARCH OR DEVELOPMENT

The invention described herein was made in the performance of work under NASA contract No. NNG004 HZ49C and is subject to the provisions of Section 305 of the National Aeronautics and Space Act of 1958 (42 U.S.C. 2457). The Government has certain rights in the invention.

FIELD

The present invention relates to dispersive spectrometers. More particularly, the present invention relates to spectrometers that separate received light into multiple orders.

BACKGROUND

Spectrometers, such as hyperspectral imaging devices, are useful in a large number of applications. For example, hyperspectral data can be used in connection with target recognition for hard targets. As another example, hyperspectral data can be used to retrieve atmospheric properties for atmospheric detection systems.

In order to sample a spectrum in hundreds of colors, a hyperspectral instrument requires a large spectral field. In addition, in order for the data to be most useful, precise co-registration between colors is required. As a result, conventional hyperspectral dispersive spectrometers having a single optical path and a single focal plane array (FPA) have required a large optical field with low distortion. In order to accommodate the large field, a traditional common path hyperspectral dispersive spectrometer requires an FPA that is very large in one dimension. Because of the large optical field and the large FPA, traditional common path hyperspectral spectrometers can be difficult to manufacture.

As can be appreciated by one of skill in the art, dispersion from a diffraction grating will contain multiple wavelength orders. As a result, some traditional spectrometers separate the signal from different wavelength orders by using multiple spectrometer legs and multiple dispersive elements. Hyperspectral systems that split the spectrum into multiple optical paths with multiple FPAs have been developed. Although such systems avoid the need for a single, large FPA, co-registration of the spectral channels can be difficult to achieve in manufacture. Maintaining proper co-registration in use can be even more difficult, as systems with multiple optical paths are particularly prone to deformation due to effects such as thermal expansion and vibration. Accordingly, spectrometers featuring multiple optical paths can be expensive to manufacture and can be difficult to keep calibrated. Alternatively, common-path spectrometers employing dual band detector arrays that can separately detect light of different wavelengths at a single pixel of a detector have been described. However, such detector arrays are difficult and expensive to manufacture. In addition, such detectors have suffered from poor signal to noise characteristics.

SUMMARY

Embodiments of the present invention are directed to solving these and other problems and disadvantages of the prior art. In accordance with embodiments of the present invention, a dual order, common path spectrometer is provided. The spectrometer includes a spatial split dichroic assembly that performs spatial separation of received light into at least two bands according to wavelength. The spectrometer also includes a dispersive element that performs spectral dispersion of received light. The spatially separated and spectrally dispersed light is passed through a focusing assembly and is focused onto a detector array.

The spatial split dichroic assembly reflects light in at least a first band of wavelengths from a first surface, and reflects light in at least a second band of wavelengths from a second surface. The first and second surfaces are non-parallel to one another. Accordingly, light in the first band of wavelengths is reflected towards a next element of the spectrometer at a first angle, while light in the second band of wavelengths is reflected towards the next element of the spectrometer at a second angle.

The dispersive element spectrally disperses received light. The dispersive element can therefore comprise a diffractive element, such as a grating or a group of slits. In accordance with other embodiments, the dispersive element may comprise a prism or a grism. The dispersive element may receive light after it has been spatially separated by the dichroic assembly. In accordance with other embodiments of the present invention, the dispersive element may receive light before it has been spatially separated by the dichroic assembly.

The spatially separated and spectrally dispersed light is focused onto a detector. In accordance with embodiments of the present invention, focusing is performed by a focusing assembly, which may comprise one or more optical elements. The detector may comprise a focal plane array (FPA).

Additional features and advantages of the present invention will become more readily apparent from the following description, particularly when taken together with the accompanying drawings.

DETAILED DESCRIPTION

Figure 1:
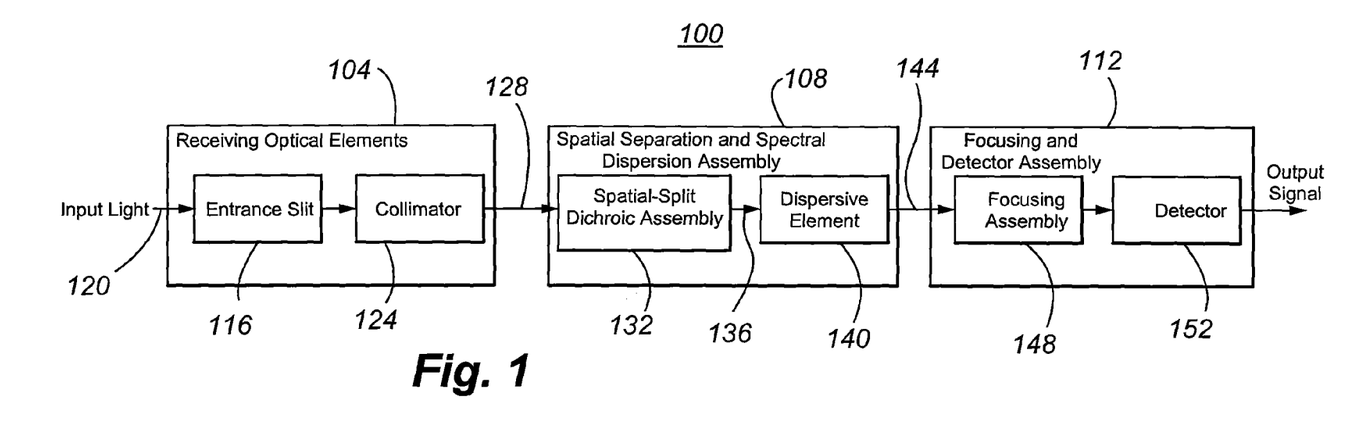
FIG. 1 is a block diagram of components of a spectrometer in accordance with embodiments of the present invention.

FIG. 1 is a block diagram of components of a spectrometer 100 in accordance with embodiments of the present invention. The spectrometer 100 generally includes receiving optical elements 104, a spatial separation and spectral dispersion assembly 108, and a focusing and detector assembly 112. The receiving optical elements 104 generally include an entrance slit or means for admitting received light 116 that admits input light 120 to the device. The input light 120 typically includes a large number of wavelengths, and therefore may comprise broadband light. Input light 120 that is admitted to the entrance slit 116 is passed to a collimator or means for collimating 124, which collimates the received light. The collimated received light 128 is then passed to the spatial separation and spectral dispersion assembly 108. In particular, in the embodiment illustrated in FIG. 1, the collimated received light 128 is passed to a spatial-split dichroic assembly 132. As will be described in greater detail elsewhere herein, the spatial-split dichroic assembly 132 spatially separates the collimated light 128 into a plurality of bands according to wavelength. The spatially separated light 136 is passed from the spatial-split dichroic assembly 132 to a dispersive element or means for spectrally dispersing 140. The dispersive element 140 spatially disperses each of the bands of light that have been spatially separated to create spatially separated and spectrally dispersed light 144. The spatially separated and spectrally dispersed light 144 is then provided to the focusing and detector assembly 112, and in particular to a focusing assembly or means for focusing 148. The focusing assembly 148 focuses the spatially separated and spectrally dispersed light onto a detector or means for detecting light 152. The detector 152 can then provide an output signal, for example containing information related to the wavelengths, intensities and spatial positions at the input to the spectrometer 104 of components of the input light 120.

Figures 2, 7A, 7B, 8:
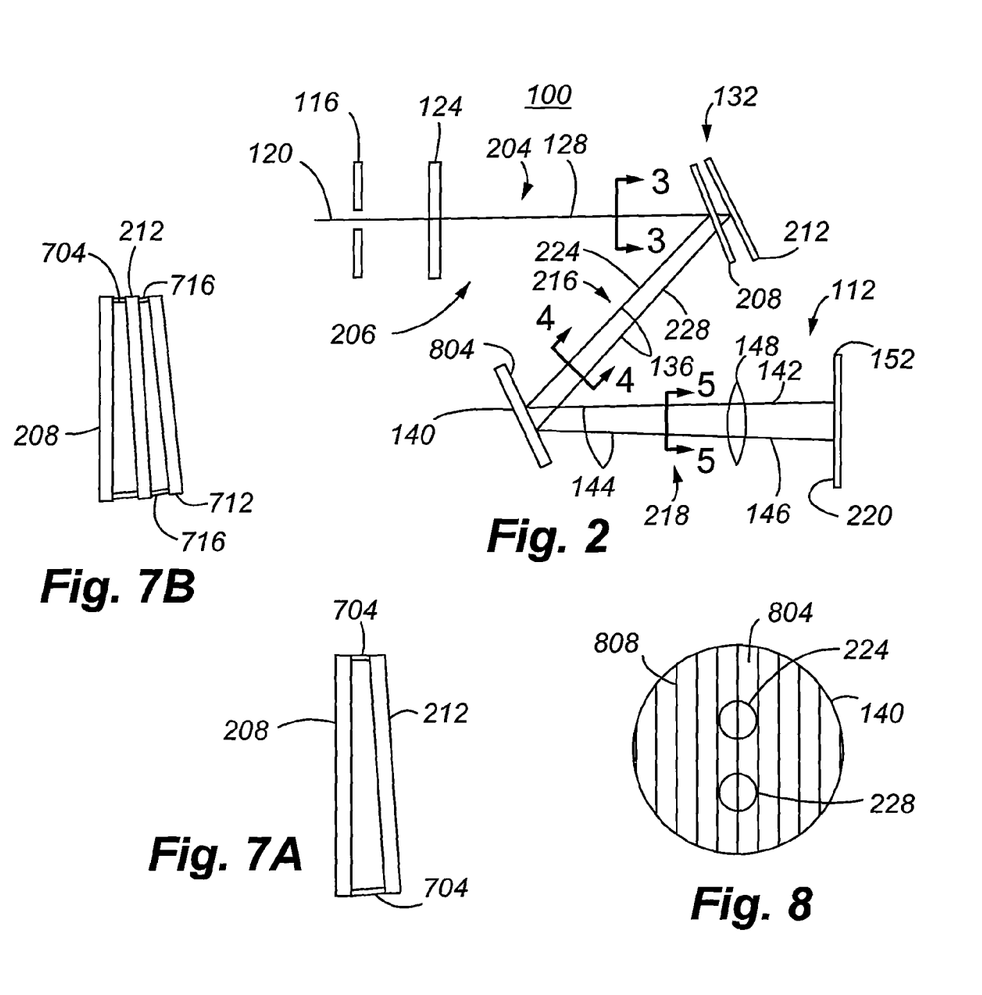
FIG. 2 is a depiction of components of a spectrometer in accordance with embodiments of the present invention.
FIG. 7A illustrates a cross section of portions of a dichroic assembly in accordance with embodiments of the present invention.
FIG. 7B illustrates a cross-section of portions of a dichroic assembly in accordance with other embodiments of the present invention.
FIG. 8 depicts a dispersive element in accordance with embodiments of the present invention in plan view.
Figure 3:
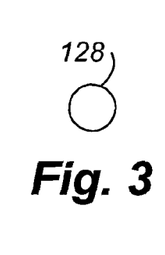
FIG. 3 depicts collimated light in the first segment of the spectrometer of FIG. 2.

FIG. 2 is a depiction of components of the spectrometer 100 depicted in FIG. 1. More particularly, FIG. 2 illustrates that input light 120 admitted to the device passes through the entrance slit 116 and through the collimator 124 and travels as collimated light 128 along a first segment 204 of the common path 206 of the spectrometer 100. FIG. 3 depicts a cross section of the collimated received light 128 along section line 3-3.

The spatial-split dichroic assembly (hereinafter referred to as the dichroic assembly) 132 is located at the terminus of the first segment 204 of the spectrometer 100. As illustrated in FIG. 2, the dichroic assembly 132 may comprise first 208 and second 212 elements. In general, the first element 208 comprises a wavelength selective element. The first element 208 reflects collimated light 128 that is within a first band of wavelengths, and transmits collimated light 128 that is within a second band of wavelengths. The second element 212 operates to reflect light in at least the second band of wavelengths. Light that is reflected by the second element 212 is generally passed back through the first element 208.

Figure 4:
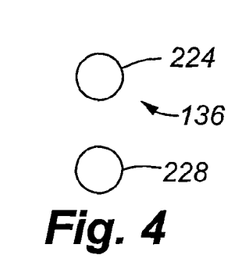
FIG. 4 depicts light that has been spatially separated according to wavelength in the second segment of the spectrometer of FIG. 2.

By way of illustration and without limitation, the first element 208 may comprise a dichroic beam splitter that reflects light having a wavelength within a range from 450 nm to 600 nm and that transmits light having a wavelength within a range of from about 600 nm to 1200 nm, while the second element 212 may comprise a mirror or broadband reflector that is capable of reflecting light having a wavelength within a range from 600 nm to 1200 nm. The dichroic assembly 132 directs light reflected from that assembly 132 along two paths, 224 and 228 inside a second segment 216 of the common path 206 of the spectrometer 100. In general, the second segment 216 extends between the dichroic assembly 132 and the dispersive element 140. The light in the first band of wavelengths 224 reflected by the first element 208 of the dichroic assembly 132 and the light in the second band of wavelengths reflected by the second element 212 of the dichroic assembly is directed at slightly different angles. In particular, the first element 208 and the second element 212 are at an angle to one another in at least one plane. By way of example, and without limitation, the angle between the first 208 and second 212 elements may be about 1°. Accordingly, light within the first and second wavelength bands are spatially separated from one another, and thus the dichroic assembly 132 creates spatially separated light 136. However, both the first and the second wavelength bands are directed generally along the second segment 216 of the spectrometer 100, and both travel from the dichroic assembly 132 to the dispersive element 140. FIG. 4 depicts the wavelength bands 224 and 228 of the spatially separated light 136 along section line 4-4. The wavelength bands 224 and 228 are shown as being separated, but the two beams comprising the wavelength bands 224 and 228 may, and generally do, overlap at the dispersive element 140.

Figure 5:
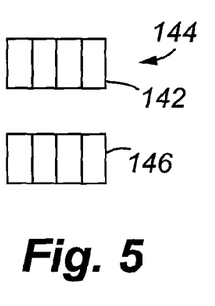
FIG. 5 illustrates light that has been spectrally dispersed in the third segment of the spectrometer of FIG. 2, and focused on to the detector of the spectrometer.

Because of the spatial separation performed by the dichroic assembly 132, the light within the different wavelength bands 224 and 228 may be incident on different areas of the dispersive element. Depending on the optical design of the spectrometer 100, the two beams 224 and 228 may fully or partially overlap at the dispersive element 140. The dispersive element 140 disperses the spatially separated received light 136, to spread that light into a spectral continuum where different wavelengths contained in the two beams 224 and 228 exit the dispersive element 140 at slightly different angles, but generally follow along a third segment 218 of the common path 206 of the spectrometer 100, from the dispersive element 140 to the focusing and detector assembly 112 of the spectrometer 100. The two beams 224 and 228 form first 142 and second 146 bands of spatially separated and spectrally dispersed light 144. The spatially separated and spectrally dispersed light 144 is then passed through a focusing assembly 148, such as a focusing lens, to form a band separated, dispersed image on a focal plane array 220 provided as part of the detector 152. FIG. 5 illustrates the bands 142 and 146 of spatially separated and spectrally dispersed light 144 along section line 5-5. Each bar of FIG. 5 indicates a different wavelength of bands 142 and 146, but the optical image is a spectral continuum dispersed as indicated in the figure. In accordance with embodiments of the present invention, at the focal plane array 220 the spatial lines within the first wavelength band imaged by the detector rows (horizontal rows detecting the light imaged in FIG. 5) are aligned with the spatial lines within the second wavelength band. For example, all wavelengths in the first band 142 originating from a single field point at the slit 116 fall on a single row of the detector 152, and all wavelengths in the second band 146 originating from the same field point at the slit 116 fall on a single row of the detector 152 that is different from the single row that the wavelengths in the first band 142 originating from that field point fall on.

In accordance with embodiments of the present invention, the spatial separation between wavelength bands created by the dichroic assembly 132 is performed in a first plane, while the spectral dispersion created by the dispersive element 140 is performed in a second plane that is primarily, but not necessarily completely, orthogonal to the first plane. By way of illustration and without limitation, the spectral lines in the first band 224 comprises light within a first order of wavelengths, while light within the second band 228 is within a second order of wavelengths. Accordingly, the field angles of the spectral bands 136 have been separated. Moreover, this is achieved in a common path spectrometer 100.

Figure 6:
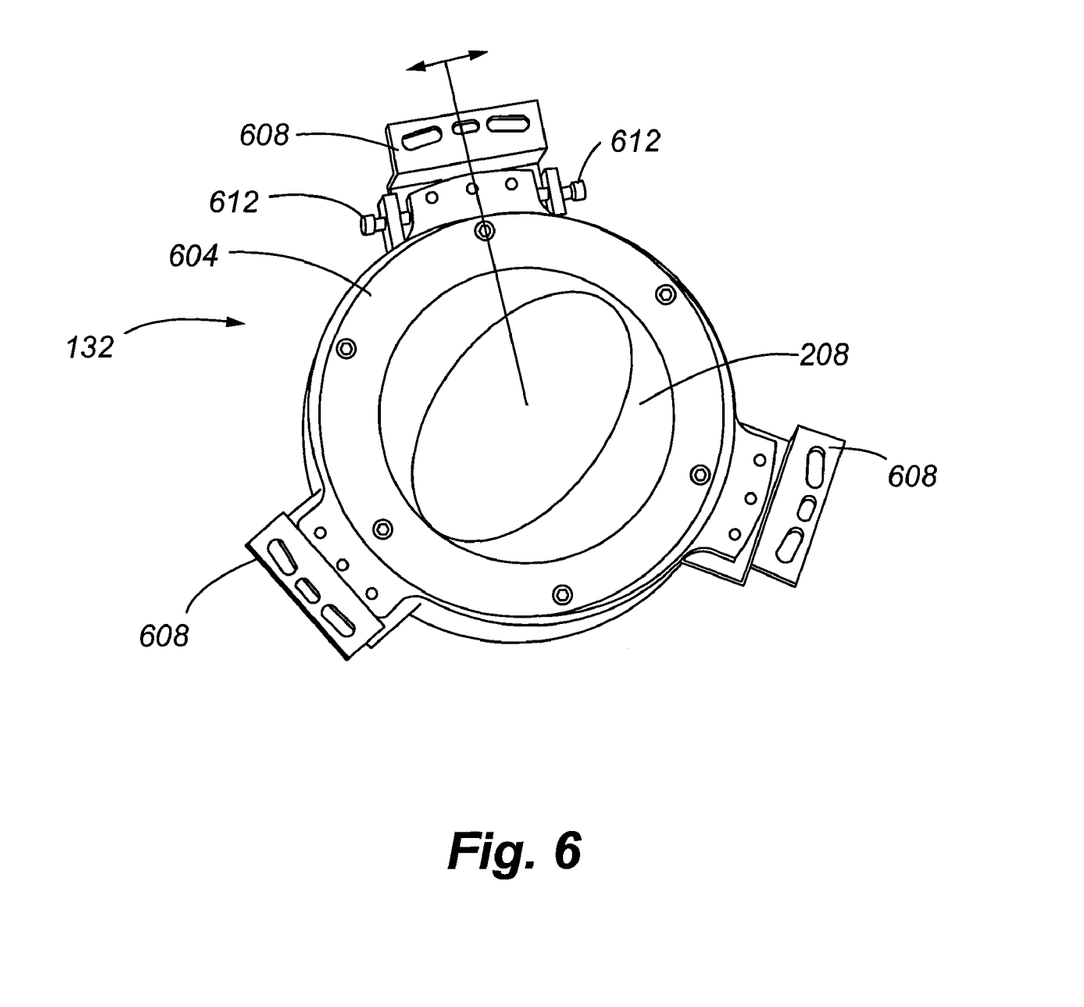
FIG. 6 illustrates a dichroic assembly in accordance with embodiments of the present invention.

FIG. 6 is a perspective view of a dichroic assembly 132 in accordance with embodiments of the present invention. In FIG. 6, the first element 208 is visible, while the second element 212 is obscured by the first 208. In the depicted embodiment, the elements 208, 212 are held within a frame 604 that is connected to mounts 608 for securing the dichroic assembly 132 to a support structure. In addition, the frame can be rotated or clocked with respect to the mounts 608 using a fine clocking adjustment mechanism 612. Because the positions of the first 208 and the second 212 elements are fixed with respect to the frame 608, by rotating the frame 604 with respect to the mounts 608 and thus the other components of the spectrometer 100, adjustments can be made to the alignment of the two bands of spectrally dispersed light at the detector 152.

FIG. 7A is a cross section of the first 208 and the second 212 elements of a dichroic assembly 132. A spacer 704 maintains the desired orientation of the elements 208, 212 relative to one another. In accordance with embodiments of the present invention, the spacer 704 does not seal the area between the elements 208 and 212 from the ambient environment. As a result, the atmosphere in contact with the faces of the first element 208 can be the same as the atmosphere contacting the faces of the second element 212, and therefore, the index of refraction of the environment at the faces of the elements 208, 212 is the same.

As previously noted, the first element 208 may comprise a dichroic or wavelength selective element that reflects light within at least a first range of wavelengths, and that transmits light within at least a second range of wavelengths. Accordingly, the first element 208 generally comprises a dichroic beam splitter. The second element 212 may comprise a mirror capable of reflecting light within at least the second range of wavelengths. Accordingly, light incident on the dichroic assembly 132 is spatially separated into different bands according to wavelength.

A separation of light into more than two bands according to wavelength is also possible. For example, components of broadband light can be separated into one of three bands by providing a first element 208 that reflects light within a first range of wavelengths and that transmits light within at least second and third ranges of wavelengths. In addition, a second element 212 that reflects light within the second range of wavelengths and transmits light within the third range of wavelengths is provided behind the first element 208 and such that the surfaces of the first and second elements 208 and 212 are at a slight angle to one another. Additionally, a third element 712 (see FIG. 7B) is provided that reflects light within the third range of wavelengths. The third element is aligned such that its reflective surface is at an angle with respect to the first 208 and second 212 elements. Moreover, in accordance with embodiments of the present invention, the different angles between the elements 208, 212 and 712 may be in a first plane, while those elements 208, 212 and 712 may be aligned within a second plane. Accordingly, spatial separation may be performed along one dimension. In accordance with such embodiments, a first spacer 704 may be interposed between the first 208 and second 212 elements while a second spacer 716 may be interposed between the second 212 and the third 712 elements.

The face 804 of a dispersive element 140, is depicted in FIG. 8. As depicted by lines 808, the dispersive element 804 may comprise a set of slits or ridges in order to disperse incident light. Accordingly, where the dispersive element 140 comprises a ridged or serrated surface, it operates reflectively, and where the dispersive element 140 comprises a set of slits, it operates transmissively. The dispersive element 140 depicted in FIG. 8 may also be a transmissive disperser that is not slit-based (e.g. a prism).

Figure 9:
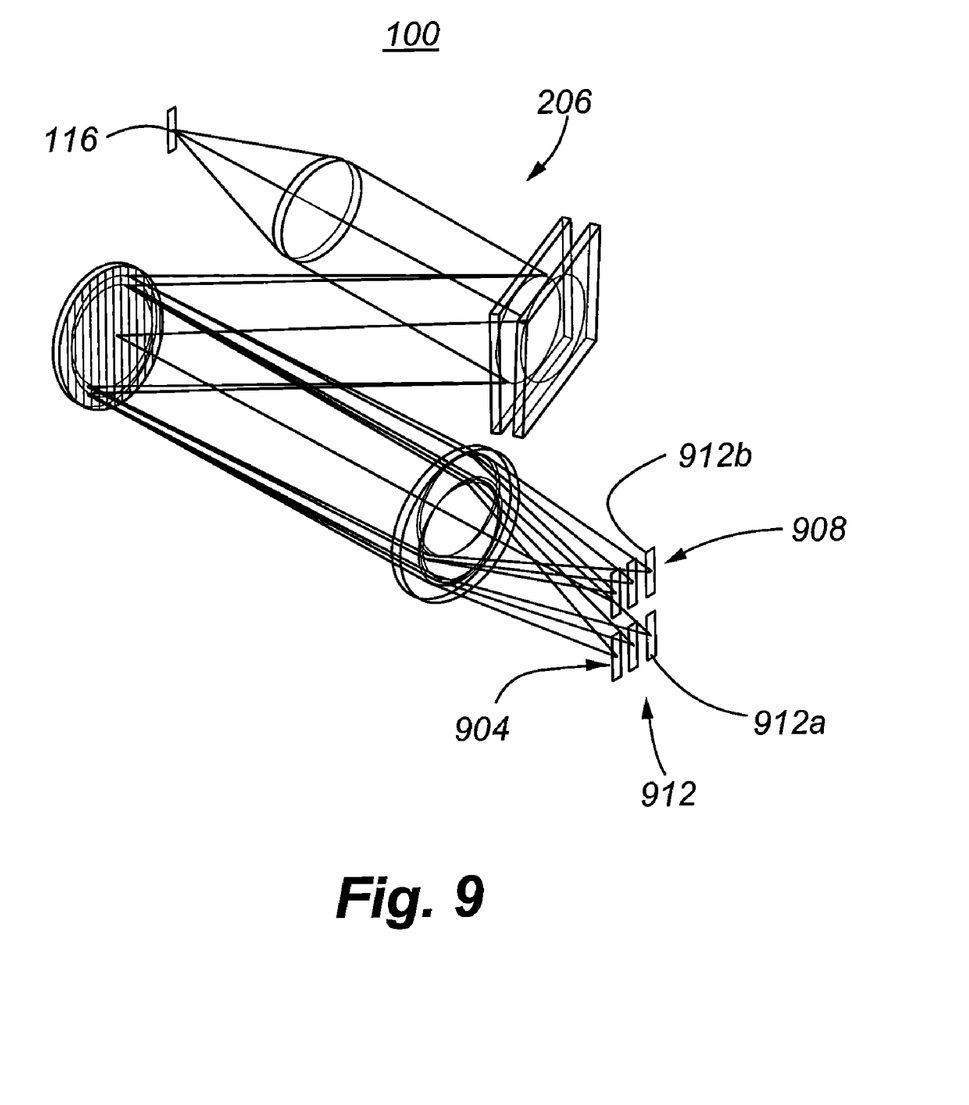
FIG. 9 is a schematic depiction of a spectrometer in accordance with embodiments of the present invention.

FIG. 9 is a perspective view of a spectrometer 100 in accordance with embodiments of the present invention. More particularly, FIG. 9 illustrates components of a spectrometer and the resulting set of images formed at the focal plane array 220 of the detector 152, as a result of the spatial separation and spectral dispersion of the received light. For purposes of illustration, the image formed from the light received at the entrance slit 116 is shown as being divided into first 904 and second 908 bands that each contain a continuum of wavelengths (represented as only three different spectral images 912). In accordance with at least some embodiments of the present invention, each spectral image 912 in the first band 904 has a wavelength that is equal to two times the wavelength of the spectral image included in the second band 908 that is aligned with the spectral image of the first band. For example, if the first spectral image 912a within the first band has a wavelength equal to a $\lambda_1$, then the corresponding first spectral image 912b of the second band 908 has a wavelength that is equal to $\lambda_1/2$. However, other arrangements are possible using a spectrometer 100 in accordance with embodiments of the present invention. For example, a non-integer relationship between a spectral image falling on a first row of pixels at the FPA that is part of the first band 908 and spectral image falling on the first row of pixels that is part of the second band 912 can be achieved in connection with embodiments of the present invention. More particularly, by aligning the dichroic assembly 132 so that the separation between wavelength bands is in a plane that is not orthogonal to the plane in which light is dispersed by the dispersive element 140, it is possible to position the spatially separated and spectrally dispersed light on the FPA such that there is not an integer relationship between each wavelength in the first band 908 and each wavelength in the second band 912. Moreover, the ratio between wavelengths in the first and second bands 908, 912 can, in accordance with embodiments of the present invention, be determined by clocking the dichroic assembly 132.

Figure 10:
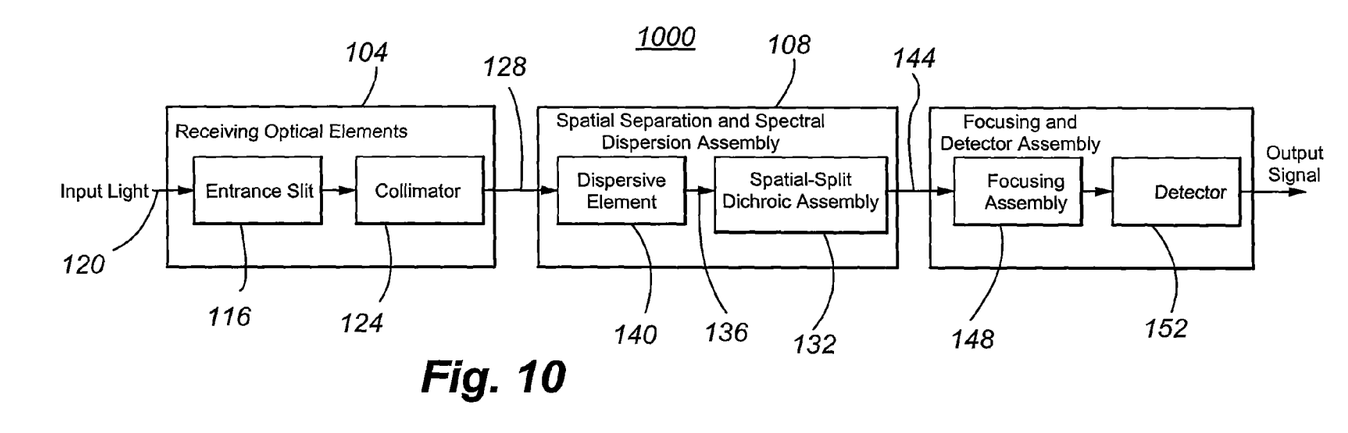
FIG. 10 is a block diagram of components of a spectrometer in accordance with other embodiments of the present invention.
Figure 11:
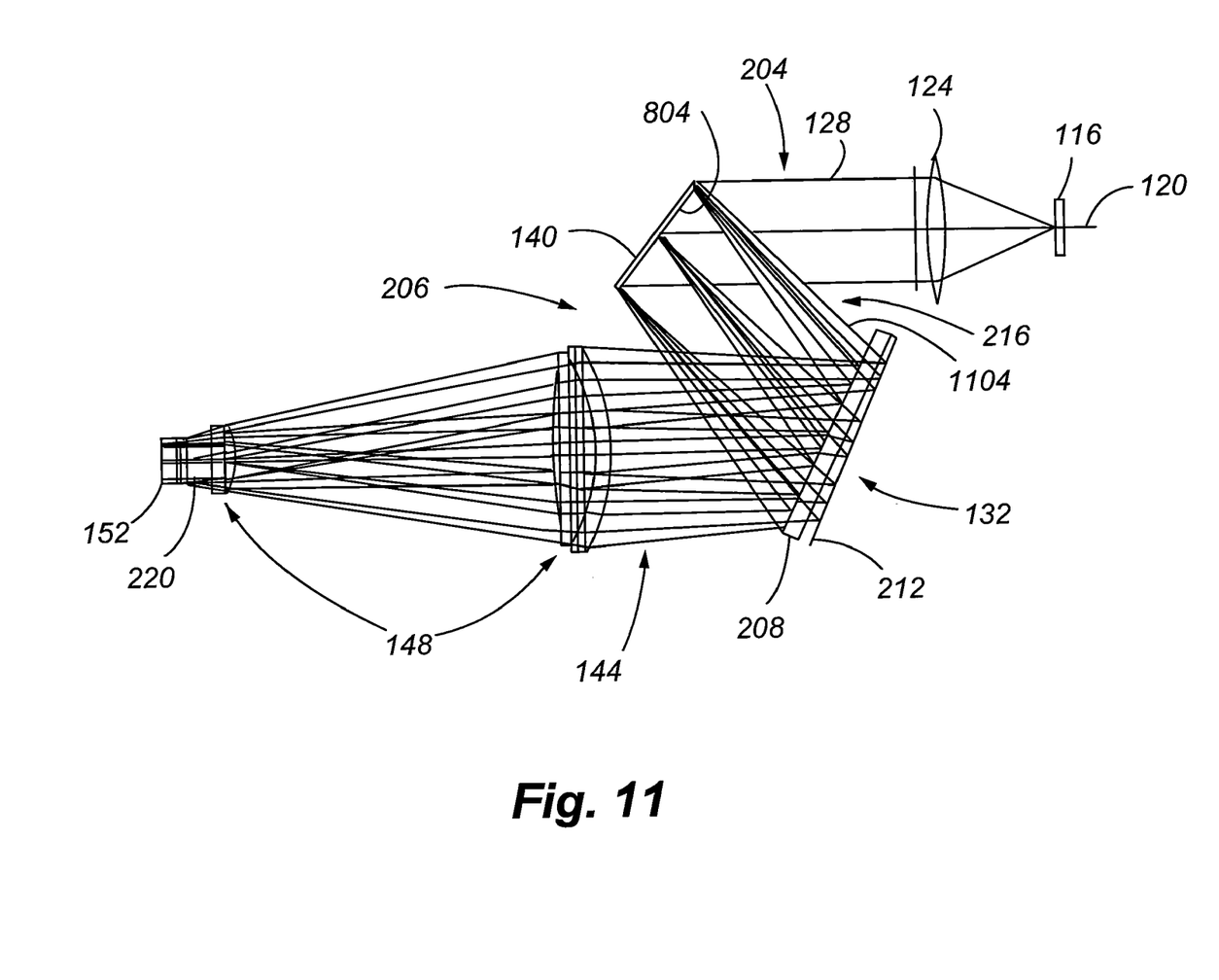
FIG. 11 is a depiction of components of a spectrometer in accordance with other embodiments of the present invention.

FIG. 10 is a block diagram of components of a spectrometer 1000 in accordance with other embodiments of the present invention. The spectrometer 1000 is similar to the spectrometer 100 illustrated in FIG. 1, except that received light is spectrally dispersed by a dispersive element 140 before it is spatially separated by a dichroic assembly 132. FIG. 11 is a depiction of components of such a spectrometer 1000. The input light 120 passes through the collimator 124. The resulting collimated light 128 travels along the first segment 204 of the spectrometer 1000 to the dispersive element 140. The dispersive element 140 creates spectrally dispersed light 1104, which is directed along the second segment 216 of the common path 206 of the spectrometer 1000. The spectrally dispersed light 1104 is then separated according to wavelength into different bands by the dichroic assembly 132, creating spatially separated and spectrally dispersed light 144 that is directed along to the focusing assembly 148 of the spectrometer 1000. The focusing assembly 148 focuses the spatially separated and spectrally dispersed light 144 onto the image plane at the focal plane array 220 of the detector 152.

Figure 12:
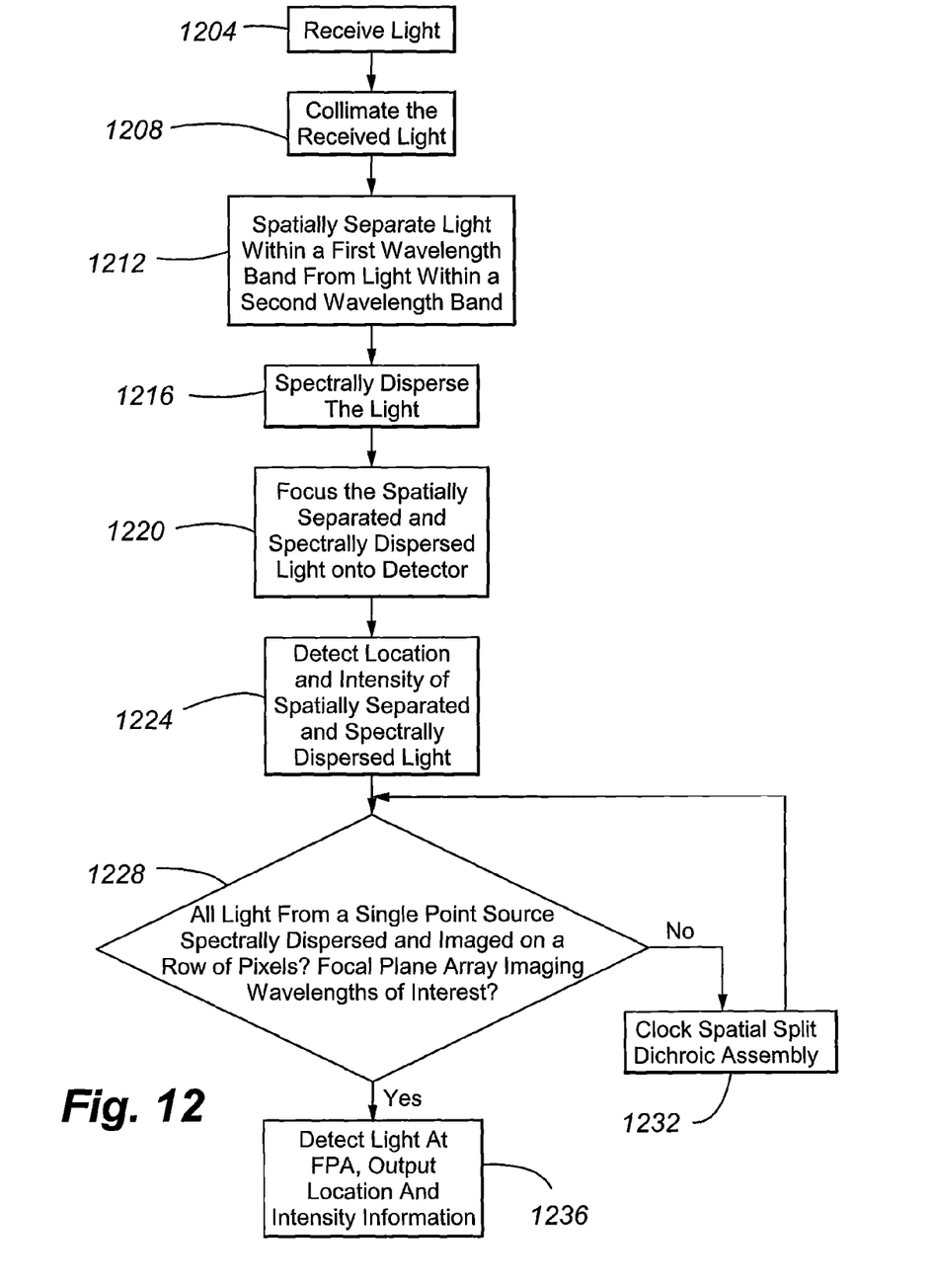
FIG. 12 is a flow chart depicting aspects of the operation of a spectrometer in accordance with embodiments of the present invention.

Aspects of the operation of a spectrometer 100 in accordance with embodiments of the present invention are illustrated in FIG. 12. Initially, at step 1204, input light 120 is received. For example, the input light 120 may be admitted by an entrance slit 116. The input light 120 is then collimated (step 1208). This may be accomplished by the use of a collimator 124.

The collimated light 128 is then spatially separated (step 1212). In particular, the collimated light 128 within a first wavelength band is directed along and at a first angle, while collimated light 128 within a second wavelength band is directed along and at a second angle with respect to the collimated light 128 within the first band of the spectrometer 100. For example, light within the first wavelength band can be along the central axis of the second segment 216 of the spectrometer 100, while light within the second wavelength band can be directed at an angle to the central axis of the second segment 216 of the spectrometer 100. Therefore, spatial separation of the light according to wavelength band is achieved, while maintaining a common path configuration.

The spatially separated light 136 is then spectrally dispersed (step 1216). For example, the spatially separated light may be dispersed by a diffraction grating or other diffractive element 140. As can be appreciated by one of skill in the art, a diffractive element operates to spread or divide light containing a number of wavelengths into those component wavelengths, thereby producing spectrally dispersed light. In accordance with embodiments of the present invention, the common path design of the spectrometer allows use of a single, unitary diffractive element 140. The resulting spatially separated and spectrally dispersed light 144 is then focused onto the detector 152 (step 1220). For example, the spatially separated and spectrally dispersed light may be passed through a focusing assembly 148.

The location and intensity of the spatially separated and spectrally dispersed light 144 on the focal plane array 152 can then be determined (step 1224). In general, for a given wavelength band, the column of pixels of the FPA 220 on which light is incident is indicative of the wavelength, while the row is indicative of the origin or spatial location of the source of the light. At step 1228, a determination is made as to whether corresponding spectral bands are all aligned with the focal plane array 152 and with one another. In particular, as can be appreciated by one of skill in the art after consideration of the present disclosure, the spectral lines from different wavelength orders are preferably aligned, to aid in confirming that all of the light from a particular wavelength band 142 or 144 incident on a particular row of pixels of the focal plane array 152 is from the same point or area in the imaged scene, and that light from the other spatially separated band 144 or 142 incident on another particular row of pixels of the focal plane array 152 is from the same point or area in the imaged scene. If it is determined either that light in the first wavelength band is not aligned with light in the second wavelength band, or that the wavelengths imaged on the focal plane array are not wavelengths or interest, the dichroic assembly 132 can be clocked (step 1232). For example, for a dichroic assembly 132 like the one illustrated in FIG. 6, the first 208 and second 212 elements can be rotated as a single unit by manipulating the fine clocking adjustment mechanism 612. The result of this rotation of the elements 208 and 212 of the dichroic assembly 132 at the focal plane array 220 is displacement in the spatial and spectral dimensions, and can be used to achieve the desired alignment of component wavelengths in the different wavelength bands at the FPA 220. For example, a relatively large change in the angle of the plane of spatial separation relative to the plane of dispersion can be used to select a desired wavelength ratio between wavelength bands 908 and 912. As a further example, a relatively small change in the plane of spatial separation relative to the plane of dispersion can be used to ensure co-registration between spectral images. After confirming that the light in the corresponding spectral bands is aligned as desired, location and intensity information can be output for realtime analysis, storage or processing (step 1236).

As can be appreciated by one of skill in the art after consideration of the present disclosure, embodiments of the present invention provide a common path spectrometer. Moreover, embodiments of the present invention incorporate a spatial split dichroic assembly 132 that allows the spectra of the shorter wavelengths to be imaged separately from the spectra of the longer wavelengths, enabling twice the spectral sampling of a traditional spectrometer on a single detector 152. In addition, the spatial split dichroic assembly 132 acts as a coarse adjust knob to tune the coregistration of the wavelength orders with respect to the focal plane array 220. For example, a relatively coarse motion (e.g., 1 degree) can allow reregistration of the spectral images in both wavelength orders by half a detector pixel. Moreover, since the spatial split dichroic assembly 132 can be shimmed to about 0.01 degrees without difficulty, the spatial split dichroic assembly 132 can be used as a co-registration tuning knob. Clocking the dichroic assembly 132 allows the co-registration to be shimmed to a couple of percent of a pixel. In addition, co-registration between the two orders is insensitive to 5 out of 6 degrees of freedom of the mounted spatial split dichroic assembly 132. In addition, the dichroic assembly 132 is the only part of the optical train that splits the beam, and both of the portions of the beam split by the dichroic assembly 132 are directed through the same elements of the spectrometer. Accordingly, co-registration alignment between the spectra of the two wavelength bands is performed by clocking or rotating the dichroic assembly 132. Motion by any other of the elements of the optical train causes the image components to move together at the focal plane array 220. Therefore, co-registration between the image orders is maintained even when such motions occur. Since the two wavelength bands or orders can fill the focal plane array 220 in the spectral dimension, the configuration provided by embodiments of the present invention allows double the number of spectral channels as compared to a conventional spectrometer.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for detecting multiple orders of light in a spectrometer, comprising:
   receiving light through an entrance slit of the spectrometer;
   spatially separating portions of the light received through the entrance slit into a first portion and a second portion according to wavelength, wherein spatially separating includes:

reflecting at least the first portion of the light received through the entrance slit at a first angle with respect to a primary axis of a first segment of the spectrometer using a first element, wherein the first portion of the light includes light within a first range of wavelengths;

transmitting at least a second portion of the light received through the entrance slit through the first element, wherein the second portion of the light received through the entrance slit includes light within a second range of wavelengths;

reflecting the second portion of the light received through the entrance slit in the second range of wavelengths that was transmitted through the first element at a second angle with respect to the primary axis of the first segment of the spectrometer using a second element;

spectrally dispersing the light received through the entrance slit;

focusing the spatially separated and spectrally dispersed light onto a detector.

2. The method of claim 1, wherein spatially separating the light received through the entrance slit is performed prior to spectrally dispersing the light received through the entrance slit.

3. The method of claim 2, wherein spectrally dispersing the light includes reflecting the first portion of the light to a first portion of a first dispersive element and reflecting the second portion of the light to a second portion of the first dispersive element.

4. The method of claim 3, wherein the first and second portions of the first dispersive element partially overlap one another.

5. The method of claim 1, further comprising:

detecting an intensity of a first wavelength in a first band of a first interference pattern derived from light within the first range of wavelengths, wherein the first wavelength of the first band includes light that has a wavelength equal to n*λ;

detecting an intensity of a first wavelength in a first band of one of the first interference pattern and a second interference pattern derived from light within the second range of wavelengths, wherein the first wavelength of the second band includes light that has a wavelength equal to m*λ.

6. The method of claim 5, further comprising:

clocking the first and second elements, wherein a location of the first wavelength of the first band on the detector is changed relative to a location of the first wavelength of the second band on the detector.

7. The method of claim 5, wherein the first wavelength of the first band is incident on at least a first pixel in a first column of pixels and a first row of pixels of the detector, and wherein the first wavelength of the second band is incident on at least a second pixel in the first column of pixels and a second row of pixels of the detector.

8. The method of claim 1, wherein spatially separating portions of the light received through the entrance slit is performed in a first dimension, and wherein spectrally dispersing the light received through the entrance slit is performed in a second dimension that is nearly orthogonal to the first dimension.

9. The method of claim 1, wherein the transmitting at least a second portion of the light received through the entrance slit in the second range of wavelengths through the first element is a first transmitting, wherein after reflecting the second portion of the light received through the entrance slit in the second range of wavelengths that was transmitted through the first element at a second angle with respect to the primary axis of the first segment of the spectrometer using a second element the spatially separating further includes:

second transmitting the second portion of the light received through the entrance slit through the first element.

10. A spectrometer, comprising:

a dichroic assembly, including:

a first element lying in a first plane, wherein the first element reflects light in at least a first range of wavelengths and transmits light in at least a second range of wavelengths;

a second element lying in a second plane, wherein the second element reflects light in at least the second range of wavelengths that has been transmitted by the first element, wherein the first and second planes are not parallel to one another, and wherein light in the first range of wavelengths reflected by the first element is spatially separated from light in the second range of wavelengths reflected by the second element;

a dispersive element, wherein light that is one of received from or passed to the dichroic assembly is dispersed spectrally by the dispersive element, and wherein after interacting with the dichroic assembly and the dispersive element light received by the spectrometer is spatially separated and spectrally dispersed;

a detector, wherein the dispersed light in the first range of wavelengths is incident on a first portion of the detector, and wherein the dispersed light in the second range of wavelengths is incident on a second portion of the detector.

11. The spectrometer of claim 10, further comprising:

a collimator.

12. The spectrometer of claim 11, wherein light is passed from the collimator to the dichroic assembly along a first segment in the spectrometer, and wherein light spatially separated by the dichroic assembly is passed from the dichroic assembly along a second segment in the spectrometer to the dispersive element.

13. The spectrometer of claim 10, wherein the dispersive element comprises a dispersion grating.

14. The spectrometer of claim 10, wherein the first and second elements of the dichroic assembly are separated by an air gap.

15. The spectrometer of claim 10, further comprising:

a focusing assembly operative to focus the spatially separated and spectrally dispersed light onto the detector.

16. The spectrometer of claim 15, wherein the detector includes a focal plane array comprising a plurality of pixels.

17. The spectrometer of claim 10, further comprising:

a dichroic assembly frame, wherein the first and second elements of the dichroic assembly are held within the frame;

a dichroic assembly mount, wherein the first and second elements of the dichroic assembly spatially separate the first and second ranges of wavelengths within at least a first plane, wherein the dispersive element spectrally disperses light in the first and second wavelengths in a second plane, and wherein the angle between the first and second planes can be adjusted by rotating the first and second elements of the dichroic assembly with respect to the dichroic assembly mount.

18. A spectrometer system, comprising:

means for admitting received light;

means for collimating admitted and received light;

means for spatially separating the admitted and received light, wherein at least a first portion of the admitted and received light is directed along a first path, and wherein at least a second portion of the admitted and received light is directed along a second path;

means for spectrally dispersing the admitted and received light;

means for focusing the spatially separated and spectrally dispersed admitted and received light, wherein the means for focusing includes at least a first element that reflects or transmits the spatially separated and spectrally dispersed admitted and received light;

means for detecting light, wherein the spatially separated and spectrally dispersed admitted and received light is focused onto the means for detecting light by the means for focusing.

19. The system of claim 18, wherein the means for spectrally dispersing the admitted and received light receives spatially separated light from the means for spatially separating.

20. The system of claim 19, wherein the spatially separated light travels along a first segment in the spectrometer between the means for spatially separating and the means for spectrally dispersing, and wherein the spatially separated and spectrally dispersed light travels along a second segment in the spectrometer between the means for spectrally dispersing and the means for focusing.

* * * * *